Nov. 22, 1966  W. M. SHOFFNER  3,286,794
APPARATUS FOR CHECKING MERCHANDISE
Filed Sept. 15, 1964  6 Sheets-Sheet 1
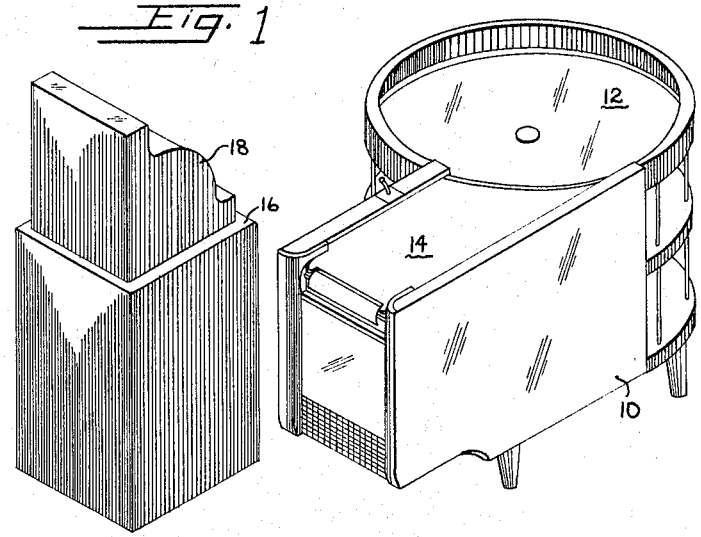
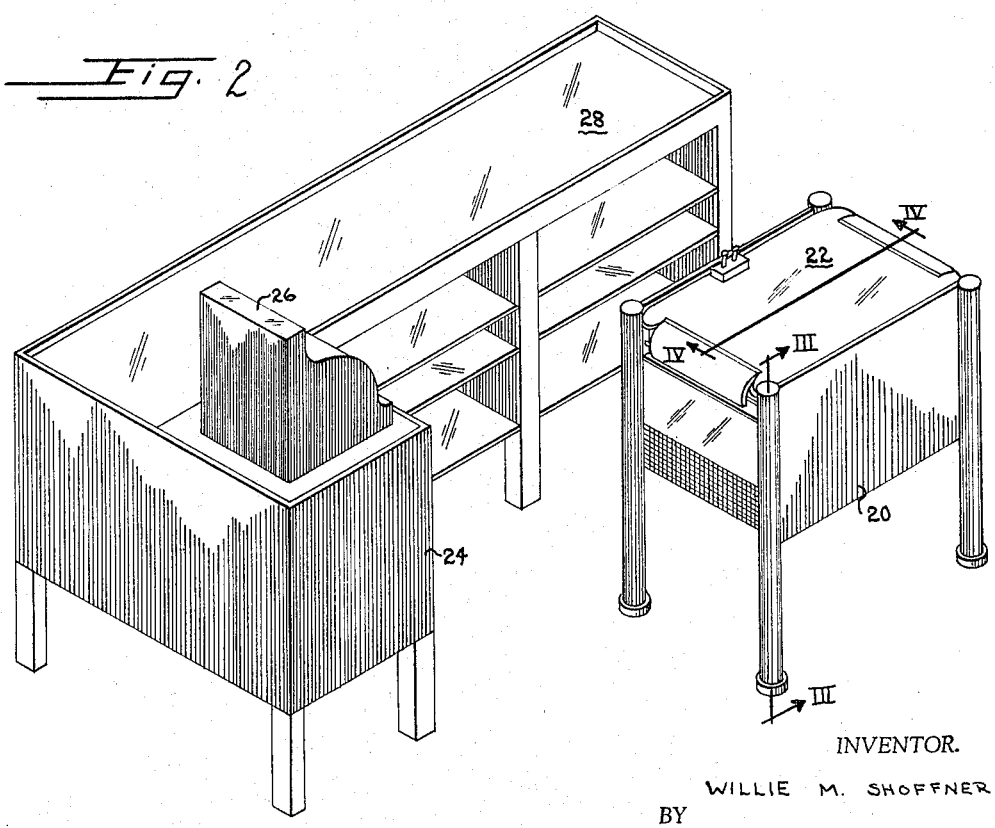
INVENTOR.
WILLIE M. SHOFFNER
BY
Toulmin & Toulmin
ATTORNEYS

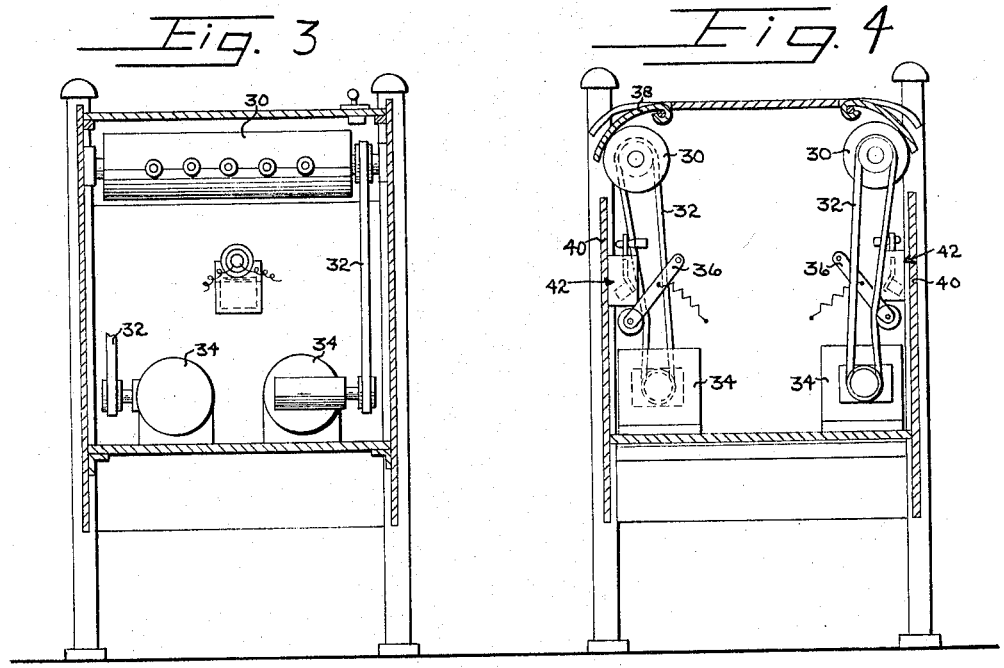

Nov. 22, 1966  W. M. SHOFFNER  3,286,794
APPARATUS FOR CHECKING MERCHANDISE
Filed Sept. 15, 1964  6 Sheets-Sheet 3
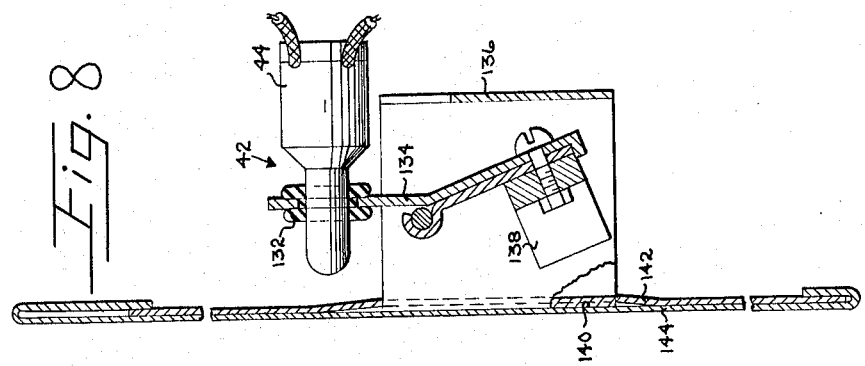
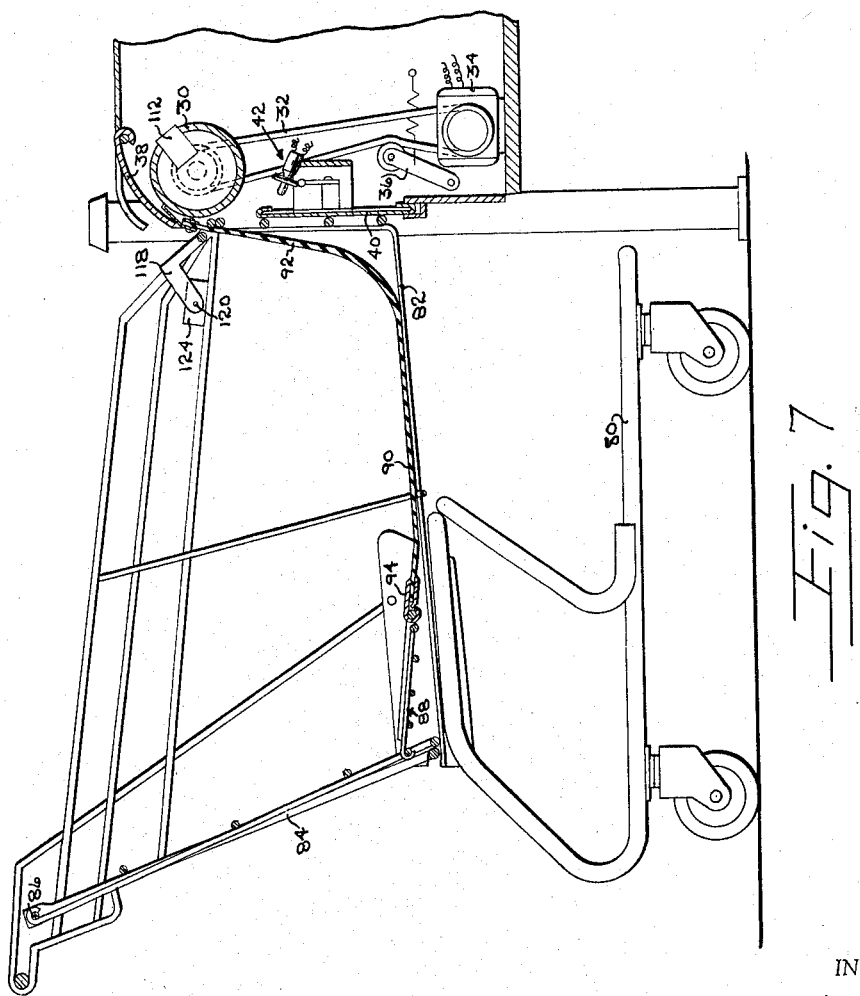
INVENTOR.
WILLIE M. SHOFFNER
BY Toulmin & Toulmin
ATTORNEYS Nov. 22, 1966  W. M. SHOFFNER  3,286,794
APPARATUS FOR CHECKING MERCHANDISE
Filed Sept. 15, 1964  6 Sheets-Sheet 4

INVENTOR.
WILLIE M. SHOFFNER
BY Toulmin & Toulmin
ATTORNEYS

Nov. 22, 1966   W. M. SHOFFNER   3,286,794
APPARATUS FOR CHECKING MERCHANDISE
Filed Sept. 15, 1964   6 Sheets-Sheet 5

INVENTOR.
WILLIE M. SHOFFNER
BY Toulmin & Toulmin
ATTORNEYS

Nov. 22, 1966   W. M. SHOFFNER   3,286,794
APPARATUS FOR CHECKING MERCHANDISE
Filed Sept. 15, 1964   6 Sheets-Sheet 6

INVENTOR.
WILLIE M. SHOFFNER
BY Toulmin & Toulmin
ATTORNEYS

United States Patent Office 3,286,794
Patented Nov. 22, 1966

3,286,794
APPARATUS FOR CHECKING MERCHANDISE
Willie M. Shoffner, 318 S. Lutheran Church Road,
R.R. 2, New Lebanon, Ohio
Filed Sept. 15, 1964, Ser. No. 396,652
8 Claims. (Cl. 186—1)

This invention relates to a method and apparatus for handling materials and is particularly concerned with a novel method and apparatus for use in retail establishments such as groceries, markets and the like for handling merchandise collected in a cart by a customer.

This invention represents a further extension and improvement of the inventive concepts disclosed in my issued Patent No. 3,083,791. More particularly still, the present invention relates to check-out counters and to carts of a particular design for cooperation therewith and to control devices pertaining to the check-out counter and cart.

The present invention has the primary object of the provision of a check-out counter and cart combination in which the customer is relieved of the burden of removing the merchandise from the cart and placing it on the check-out counter. A still further object of this invention is the provision of a check-out counter and cart arrangement which permits the check-out counter to be made much smaller and more compact than has heretofore been possible.

Still another object of this invention is the provision of a greatly improved cart structure for use with an automatic check-out counter of the nature referred to.

A still further object of this invention is the provision of a check-out counter and cart structure and the method of operating the same which will permit the merchandise to be removed from the cart in which it is collected by the customer and placed directly in bags in another cart to be removed from the store area by the customer without intermediate handling of the merchandise, and in particular, without requiring any additional personnel to sack the merchandise.

These and other objects and advantages of this invention will become more apparent upon reference to the following specification taken in connection with the accompanying drawings, in which:

FIGURE 1 is a somewhat diagrammatic perspective view showing a check-out counter of a substantially conventional general arrangement adapted for being employed with a cart structure according to the present invention;

FIGURE 2 is a perspective view similar to FIGURE 1 but shows a more refined arrangement of the check-out counter which utilizes fully the principles of the present invention;

FIGURE 3 is a sectional view indicated by line III—III on FIGURE 2 showing details of the check-out counter;

FIGURE 4 is a sectional view indicated by line IV—IV on FIGURE 2 showing other details in connection with the check-out counter;

FIGURE 5 shows the control circuit for the check-out counter;

Figure 9:
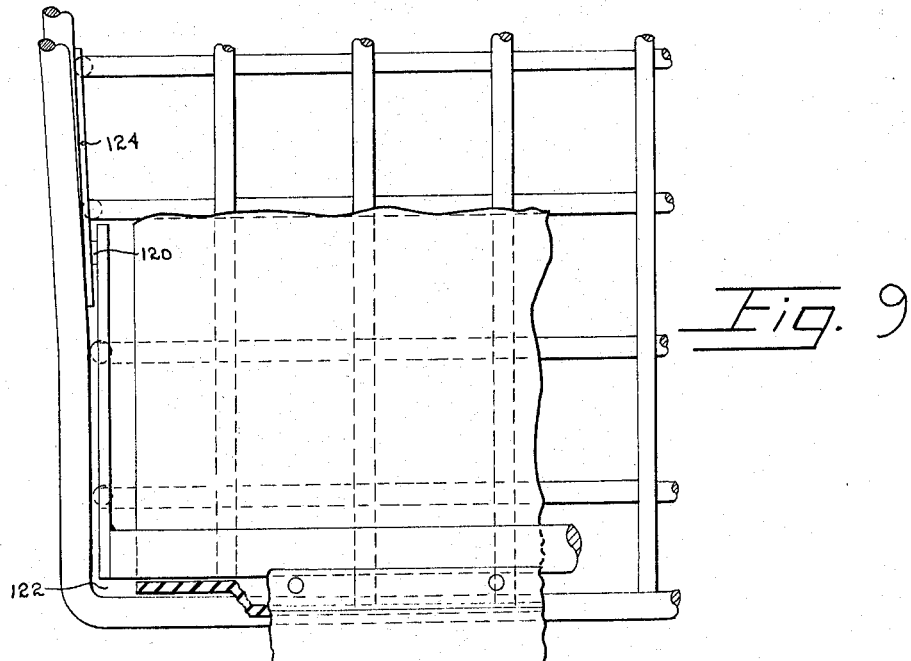
Figure 10:
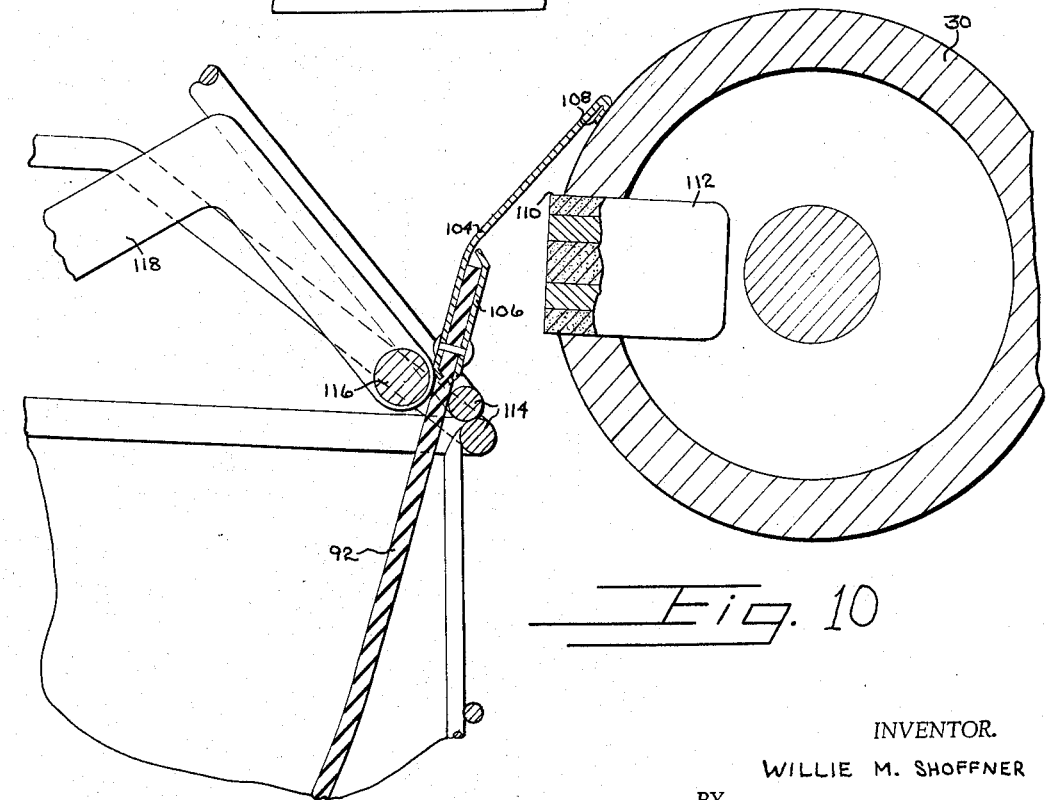
Figure 11:
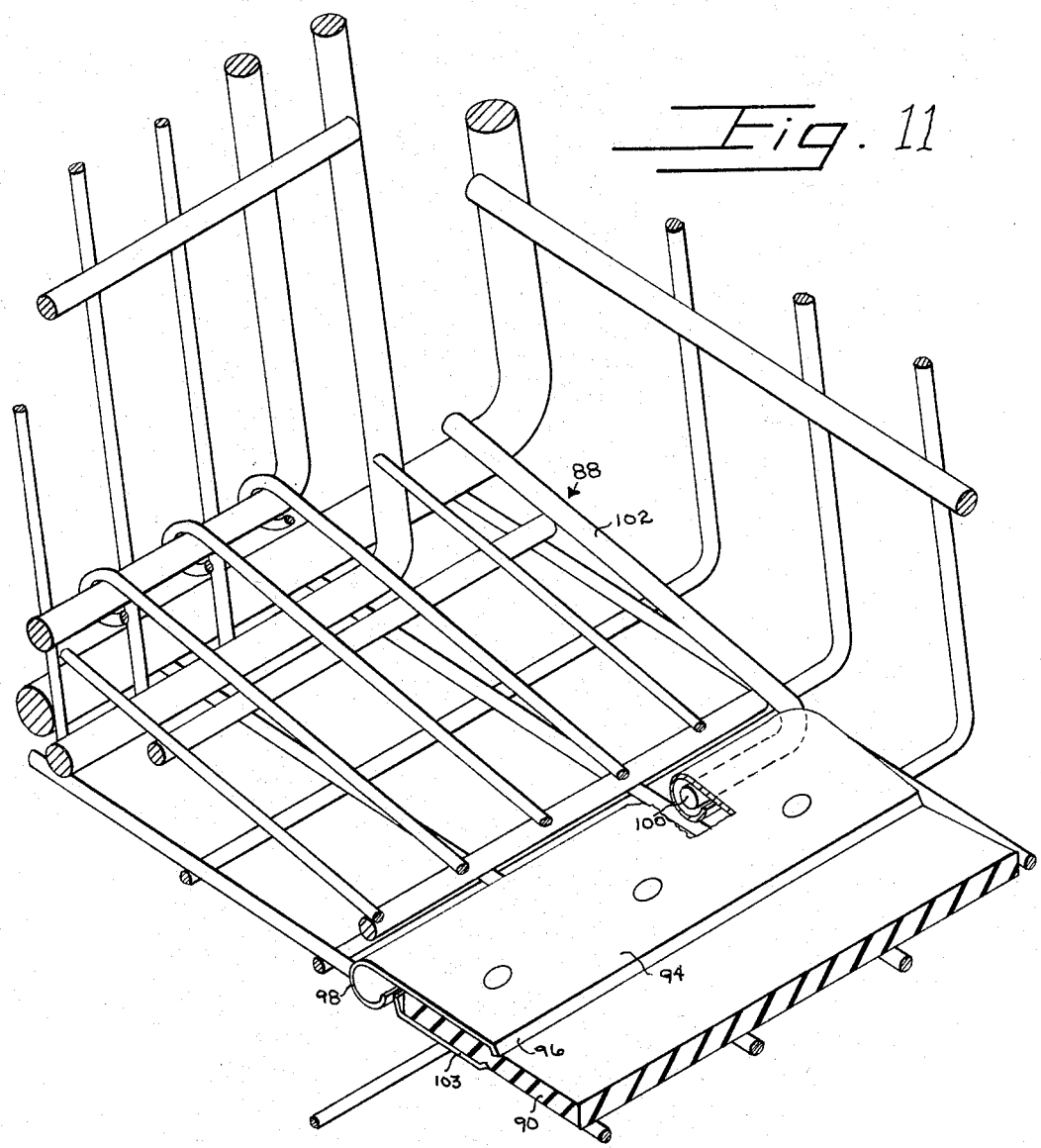
Figure 12:
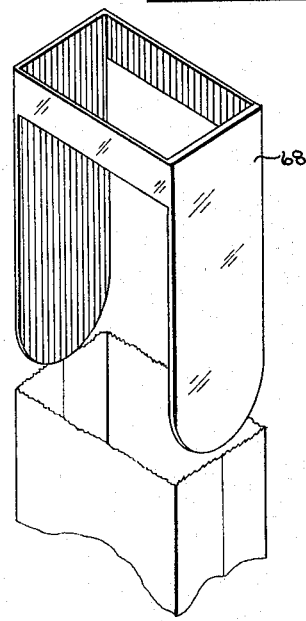
Figure 13:
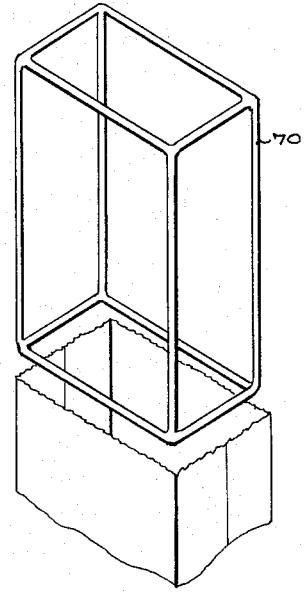
Figure 14:
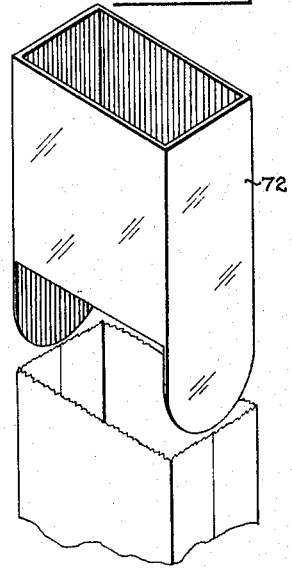

FIGURE 6 indicates schematically the check-out counter and a pair of carts according to this invention operatively associated and in the process of which the merchandise in one cart is checked out by the cash regitser operator and transferred to sacks or bags in the other cart;

FIGURE 7 is a view showing more or less in detail the construction of a cart according to this invention with portions of the cart structures left off to provide for a clearer showing of the novel features of the present invention;

FIGURE 8 is a fragmentary sectional view showing a novel proximity switch pertaining to the check-out structure and operated by a cart when brought in against the check-out counter for controlling the control circuit of the check-out counter;

FIGURE 9 is a plan view partly broken away looking down on one corner of a cart structure showing the manner in which a belt forming an important part of the cart structure is guided into the outer cart;

FIGURE 10 is a sectional view drawn at considerably enlarged scale and illustrating the manner in which an operative connection is effected between the belt in the cart and a drive roller carried by the check-out counter;

FIGURE 11 is a perspective view showing details in connection with the construction of the cart and, in particular, showing the inwardly swingable rear gate of the cart in the bottom and the manner in which the belt of the cart is connected to the gate, and FIGURES 12 through 15 are perspective showings of devices to be inserted into sacks to hold them in distended position during the placing of merchandise therein.

Referring to the drawings somewhat more in detail, in FIGURE 1 the check-out counter comprises frame means 10 which may have a rotary table 12 therein and a platform 14 adjacent cash register stand 16. The merchandise in a cart is picked up by the check-out clerk operating cash register 18 and pushed along platform 14 to rotary table 12 where the merchandise can be picked up by another employee.

In FIGURE 2 the check-out counter comprises a relatively small pedestal 20 having a small platform 22 in the top. The check-out counter is adjacent a cash register stand 24 carrying cash register 26 and may comprise a shelf and table 28 for holding sacks and the like.

As will be seen in FIGURES 3 and 4, check-out counter 10 at its left end and the check-out counter 20 at both ends have rotary roll means 30 adapted for cooperation with a belt in the merchandise cart to be described hereinafter. Each roll 30 is connected by a belt 32 with the output shaft of a geared head drive motor 34. Each belt may be provided with belt tightener means 36 if so desired.

As will best be seen in FIGURE 4, each roll 30 has resting thereon the curved plate 38 pivoted to the adjacent end of the platform of the check-out counter; in the case of FIGURES 4 and 5, platform 22. These curved plates, as will be seen hereinafter form bridges between the belt of the merchandise cart and the platform of the check-out counter.

Each of the front and back sides of the check-out counter includes non-magnetic plate means 40 against which the merchandise carts are pushed. Inside non-magnetic plate 40 is a proximity switch 42, to be described more fully hereinafter, and which is operable for controlling the circuit of the pertaining motor 34. In brief, when a cart is adjacent one side of the check-out counter, the pertaining proximity switch is closed and when the cart is removed from the check-out counter, the proximity switch opens.

In FIGURE 5 the mercury switch elements 44 of the proximity switch are illustrated as being connected between power lines L1 and L2 in series with their respective reversible motors 44 and the respective manually operated reversing switches 46 for the said motors. Switches 46 are normally open but can be manually shifted in respectively opposite directions for obtaining reversible rotation of the respective motors 34 connected thereto.

The checking out of merchandise in the preferred arrangement of FIGURE 2 is schematically illustrated in FIGURE 6. In FIGURE 6 a cart 50 loaded with merchandise 52 is engaged with the left side of a check-out counter 54 whereas a cart 56 is in engagement with the right side of the check-out counter.

Roll 58 of the check-out counter has been operated to draw in belt 60 of cart 50 so as to elevate the merchandise therein to a level where it can easily be picked up by the cash register operator. Similarly, roll 62 at the right side of the check-out counter has pulled in belt 64 of cart 56 to such an extent that sacks 66 can be placed in cart 56 in such a position that the cash register operator can immediately introduce into the sacks articles of merchandise that have been picked up from cart 50 and noted on the cash register. The individual rolls 58 and 62 are under the control of individual switches, according to the circuit of FIGURE 5 so that belt 60 of the cart containing the merchandise can be pulled up if desired so that all of the merchandise therein is finally elevated to such a level that it can easily be picked up by the cash register operator without bending over.

Figure 15:
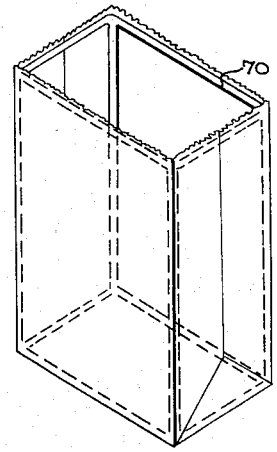

The sacks 66 may be held in their distended positions by distending devices that can be slipped therein which may be made out of cardboard or plastic or thin metal and which may be foldable or rigid, or which may be tapered so as to rest together when not in use. These devices are placed in the sacks and hold the sacks wide open until the sacks have been filled and, after the sacks are thereafter set upright, the devices can be pulled out from the sacks. FIGURES 12 through 15, show a plurality of such devices, devices 68 in FIGURE 12 comprising a top rim and two side flap members; device 70 in FIGURE 13 consisting of a wire-like frame; device 72 in FIGURE 14 being quite similar to device 68 of FIGURE 12 but extending farther down between the side flaps of the device. FIGURE 15 shows a device 70 according to FIGURE 13 disposed in a sack.

FIGURE 7 shows details in connection with the novel cart according to the present invention. The cart comprises a base portion 80 of substantially conventional nature and carried on the upper portion thereof is a basket portion 82 of crossing rods or the like making a sort of mesh work basket of relatively light weight. These baskets taper inwardly from the back to the front so that they can be telescoped for storage. Base portion 80 also tapers inwardly from the back to the front and this permits them to be nested together for storage. The back wall 84 of the basket is swingable inwardly about the pivot bar 86 at the top edge. Secured to a lower portion of back wall 84 is a relatively short grid 88 made up of crossing bars and pivotally connected to the front end of the gate is the back edge of a flexible rubber-like belt 90. Belt 90 extends along the bottom of the basket and is supported by the bars making up the bottom of the basket. Toward the front of the basket belt 90 turns upwardly as at 92 and extends to the top edge of the front wall of the basket. The aforementioned construction will be clearly seen in FIGURES 9, 10 and 11 wherein it will be noted that at the back end of belt 90 there is an upper metal clip 94 having its front edge 96 crimped into the material of the belt while its back edge 98 is formed substantially to a circular configuration. The circular configuration receives the turned in front ends 100 of side bars 102 of the grid-like member 88.

The bottom of the back edge of belt 90 carries another metal clip 103 also crimped into the belt at its front edge and backwardly at its back edge so that the belt is tightly gripped by the metal members.

As will best be seen in FIGURE 10, the top edge of the upwardly extending front portion 92 of belt 90 similarly equipped with two metal clips 104 and 106 riveted to the belt by clip 104 extends outwardly from the leading edge of the belt at an angle and has its leading edge turned back as indicated at 108. This turned back leading edge is adapted for catching on the leading corner 110 of a permanent magnet 112 set into the adjacent one of rollers 30. When roller 30 rotates the magnet will catch on turn back edge 108 and the metal clip will be held against the magnet and rotation of roller 30 will thus cause the belt to be drawn around and pull the belt upwardly in the basket and cause the back wall to swing inwardly and thus cause the action to take place that is illustrated in FIGURE 6.

The belt can be drawn completely inwardly so that the back wall extends substantially straight inwardly from its pivotal connection with the basket and this will dispose all of the merchandise within the easy reach of the check-out clerk. Reversing of roller 30 will, of course, cause the belt 90 to feed back into the cart, and when the belt is returned to its FIGURE 10 position, further rotation of roller 30 will disengage the magnets from clip 104 and the cart can be readily removed from the check-out counter.

The construction of the cart at the leading edge of the belt is important and is illustrated in FIGURES 9 and 10. The cart has its front wall reduced in height so as to present the end of the belt to the roller in the proper level and the cart comprises transversely extending rods 114 on the front side of the belt and a somewhat larger rod 116 in the back of the belt which is mounted on the arms 118 pivoted to the side walls of the basket at 120 (FIGURE 7). The bars define a space through which the belt can move freely while, upon feeding the belt into the cart, the metal clips 104 and 106 stop against bars 114 and 116. The pivotally supported bar 116 permits the bar to be drawn up tight without any interference from this leading bar. FIGURE 9 shows in plan the space 122 through which the belt is freely movable and also indicates the point of pivotal connection 120 and the bracket means 124 on the cart that carries the pivot for the arms 118.

The structure of the aforementioned proximity switch 42 is more fully shown in FIGURE 8. Each proximity switch comprises a mercury filled capsule 44 held in a rubber-like grommet 132 on the upper end of an arm 134 pivoted in a U-shaped bracket 136. The lower end of arm 134 carries a permanent magnet 138 which serves also as a counterweight for normally tapering arm 134 into its FIGURE 8 position and wherein mercury capsule 44 is open. Upon the movement of a cart up to the check-out counter, a metal plate on the cart or an adjacent rod on the cart will attract permanent magnet 138 and arm 134 will then move to its FIGURE 7 position and the capsule 44 will close.

Bracket 136 has laterally extending legs at the front at 140 which are engaged on one side of a plate 142 that is held in turned-up edges of another plate 144 which forms a close member for the check-out counter. Plates 142 and 144 are non-magnetic being formed, for example, of aluminum. The mounting of mercury capsule 44 and rubber grommet 132 permits adjustment of the mercury capsule in the grommet in the direction of its length whereby the sensitivity of the mercury switch can readily be controlled.

It will be understood that this invention is susceptible to modification in order to adapt it to different usages and conditions; and accordingly, it is desired to comprehend such modifications within this invention as may fall within the scope of the appended claims.

What is claimed is:

1. In a merchandise check out arrangement; a check out counter having platform means for receiving articles of merchandise, a cart for transporting articles of merchandise to said counter and having an upper basket portion open toward the top, said basket portion having a back wall swingable inwardly of the basket about the upper edge of the back wall, said basket portion having a flexible member forming the front wall and at least the major portion of the bottom wall of the basket portion, means pivotally connecting the back edge of said flexible member with said back wall in the region of the bottom thereof, the front edge of said flexible member projecting outwardly from the region of the top of the front edge of said cart, and roll means on the check out counter engageable with the said front edge of said flexible member and operable for drawing said flexible member about the said roll means thereby to elevate articles in the cart for ease of handling by a check out clerk, said roll means comprising magnet elements in axially distributed relation thereon, and the front edge of said flexible member having a magnetic strip thereon engageable with said magnet elements.

2. A merchandise check out arrangement according to claim 1 in which said means connecting the back edge of said flexible member of said back wall comprising a rigid member connected at its front edge with the rear edge of the flexible member and pivotally connected at its rear edge to said back wall, said rigid member having substantially the same width as said basket portion and having a length from its rear edge to its front edge which is a substantial fractional part of the length of said basket portion, the region of the pivotal connection of the rear edge of said rigid member with said back wall being spaced upwardly from the bottom edge of said back wall to prevent said flexible member from dragging on the said supporting lower wall of said basket portion when the back wall thereof swings backwardly.

3. In a merchandise check out arrangement; a check out counter having a platform means for receiving articles of merchandise, a cart for transporting articles of merchandise to said counter and having an upper basket portion open toward the top, said basket portion having a back wall swingable inwardly of the basket about the upper edge of the back wall, said basket portion having a flexible member forming the front wall and at least the major portion of the bottom wall of the basket portion, means pivotally connecting the back edge of said flexible member with said back wall in the region of the bottom thereof, the front edge of said flexible member projecting outwardly from the region of the top of the front edge of said cart, and roll means on the check out counter engageable with the said front edge of said flexible member and operable for drawing said flexible member about the said roll means thereby to elevate articles in the cart for ease of handling by a check out clerk, said roll means comprising magnet elements in axially distributed relation thereon, and the front edge of said flexible member having a magnetic strip thereon engageable with said magnet elements, said magnet elements projecting slightly from the surface of said roll means and said strip of magnetic material having a turned under leading edge engageable with the leading sides of said magnet means to provide a mechanical driving connection between said roll means and said flexible member.

4. A merchandise check out arrangement comprising; a check out counter having a substantially rectangular platform at the top for receiving articles, roll means at each of two opposite sides of said counter beneath the edges of said platform, and a pair of merchandise carts for transporting articles to and from said counter and comprising basket means open at the top, each said basket means comprising a back wall swingable inwardly of the basket means from the upper edge of the back wall, flexible bottom wall means connected to the back wall in the region of the lower edge thereof, flexible front wall means connected to said front end of said bottom wall means and extending upwardly to the region of the top of the front wall of the basket means, one of said carts being positioned with its front end at each of said two opposite edges of said counter, means for detachably connecting the upper end of each said front wall means with the adjacent one of said roll means, said roll means being rotatable in one direction to draw the flexible wall means about the roll means to elevate the bottom wall means of the carts, said roll means being rotatable in the opposite direction to pay out the flexible wall means wound thereon to lower the bottom wall means of the carts, and control means for selectively causing rotation of the respective roll means in either direction of rotation thereof, said control means being operable from an operator's position at a third side of said counter whereby a loaded cart at one of two opposite edges can have the bottom wall thereof progressively elevated to lift the articles therein to within easy reach of an operator in the operator's position at said third side of the counter, while an unloaded cart positioned at the other of said two opposite edges of the counter can have the bottom thereof initially at least partially elevated to support bags within easy reach of the operator for receiving articles as they are removed from said loaded cart and checked out.

5. A merchandise check out arrangement according to claim 4 in which said control means includes a reversible electric motor connected to each said roll means and control switches for the motors located on said counter adjacent the operator's position.

6. A merchandise check out arrangement comprising; a check out counter having a substantially rectangular platform at the top for receiving articles, roll means at each of two opposite sides of said counter beneath the edges of said platform, and merchandise cart means for transporting articles to and from said counter and comprising basket means open at the top, said basket means comprising a back wall swingable inwardly of the basket means from the upper edge of the back wall, flexible bottom wall means connected to the back wall in the region of the lower edge thereof, flexible front wall means connected to said front end of said bottom wall means and extending upwardly to the region of the top of the front wall of the basket means, means for detachably connecting the upper end of said front wall means with a respective one of said roll means so the said flexible wall means can be drawn about the roll means thereby to elevate articles in the cart means, or to lower articles therein upon reversal of the roll means, and means for reversably individually actuating said roll means, said means for reversably actuating said roll means comprising a reversible motor connected to each roll means, a control circuit including manual switch means for each motor, and normally open proximity switch means in each of said circuits adapted for actuation to closed position by the movement of a cart means into operative position adjacent the pertaining said roll means, said counter having arcuate plate means pivotally connected to each edge of the said platform in at least partially covering relation to the adjacent said roll means tiltable upwardly to expose the roll means and adapted to rest on the flexible front wall means when the latter is connected to the roll means.

7. A merchandise check out arrangement comprising; a check out counter having a substantially rectangular platform at the top for receiving articles, roll means at each of two opposite sides of said counter beneath the edges of said platform, and merchandise cart means for transporting articles to and from said counter and comprising basket means open at the top, said basket means comprising a back wall swingable inwardly of the basket means from the upper edge of the back wall, flexible bottom wall means connected to the back wall in the region of the lower edge thereof, flexible front wall means connected to said front end of said bottom wall means and extending upwardly to the region of the top of the front wall of the basket means, means for detachably connecting the upper end of said front wall means with a respective one of said roll means so the said flexible wall means can be drawn about the roll means thereby to elevate articles in the cart means, or to lower articles therein upon reversal of the roll means, and means for reversably individually actuating said roll means, said means for reversably actuating said roll means comprising a reversable motor connected to each roll means, a control circuit including manual switch means for each motor, and normally open proximity switch means in each of said circuits adapted for actuation to closed position by the movement of a cart means into operative position adjacent the pertaining said roll means, said counter having arcuate plate means pivotally connected to each edge of the said platform in at least partially covering relation to the adjacent said roll means tiltable upwardly to expose the roll means and adapted to rest on the flexible front wall means when the latter is connected to the roll means, said cart means including a first transverse bar in front of the front wall means and fixed to the cart means and a second transverse bar in back of the front wall means moveably carried by the cart means, said bars defining a space through which said front wall means freely moves when being fed into the cart means, said second bar being moveable upwardly when said front wall means is drawn up.

8. A merchandise check out arrangement comprising; a check out counter having a substantially rectangular platform at the top for receiving articles, roll means at each of two opposite sides of said counter beneath the edges of said platform, and merchandise cart means for transporting articles to and from said counter and comprising basket means open at the top, said basket means comprising a back wall swingable inwardly of the basket means from the upper edge of the back wall, flexible bottom wall means connected to the back wall in the region of the lower edge thereof, flexible front wall means connected to said front end of said bottom wall means and extending upwardly to the region of the top of the front wall of the basket means, means for detachably connecting the upper end of said front wall means with a respective one of said roll means so the said flexible wall means can be drawn about the roll means thereby to elevate articles in the cart means, or to lower articles therein upon reversal of the roll means, and means for reversably individually actuating said roll means, said means for reversably actuating said roll means comprising a reversable motor connected to each roll means, a control circuit including manual switch means for each motor, and normally open proximity switch means in each of said circuits adapted for actuation to closed position by the movement of a cart means into operative position adjacent the pertaining said roll means, said counter having arcuate plate means pivotally connected to each edge of the said platform in at least partially covering relation to the adjacent said roll means tiltable upwardly to expose the roll means and adapted to rest on the flexible front wall means when the latter is connected to the roll means, said cart means including a first transverse bar in front of the front wall means and fixed to the cart means and a second transverse bar in back of the front wall means moveably carried by the cart means, said bars defining a space through which said front wall means freely moves when being fed into the cart means, said second bar being moveable upwardly when said front wall means is drawn up, said front wall means including clip elements on the leading edge which cannot pass between said bars.

References Cited by the Examiner

UNITED STATES PATENTS

| | | | |
|---|---|---|---|
| 2,182,464 | 12/1939 | Blackstone | 53—254 |
| 2,355,201 | 8/1944 | Blackstone | 53—254 |
| 2,641,400 | 6/1953 | Simmons | 186—1.1 |
| 2,808,127 | 10/1957 | Wesberry | 186—1 X |
| 2,902,811 | 9/1959 | Joyce | 186—1.1 |
| 2,943,707 | 7/1960 | Ramlose | 181—1 |
| 2,980,212 | 4/1961 | Foster | 186—1.1 |
| 3,025,651 | 3/1962 | Stanley | 186—1 X |
| 3,083,791 | 4/1963 | Shoffner | 186—1.1 |
| 3,115,975 | 12/1963 | Thompson | 186—1.1 |
| 3,175,057 | 3/1965 | Winslow | 200—61.41 |
| 3,187,127 | 6/1965 | Hess | 200—61.41 |

FOREIGN PATENTS

| | | |
|---|---|---|
| 858,639 | 1/1961 | Great Britain. |

SAMUEL F. COLEMAN, *Primary Examiner.*